UNITED STATES PATENT OFFICE.

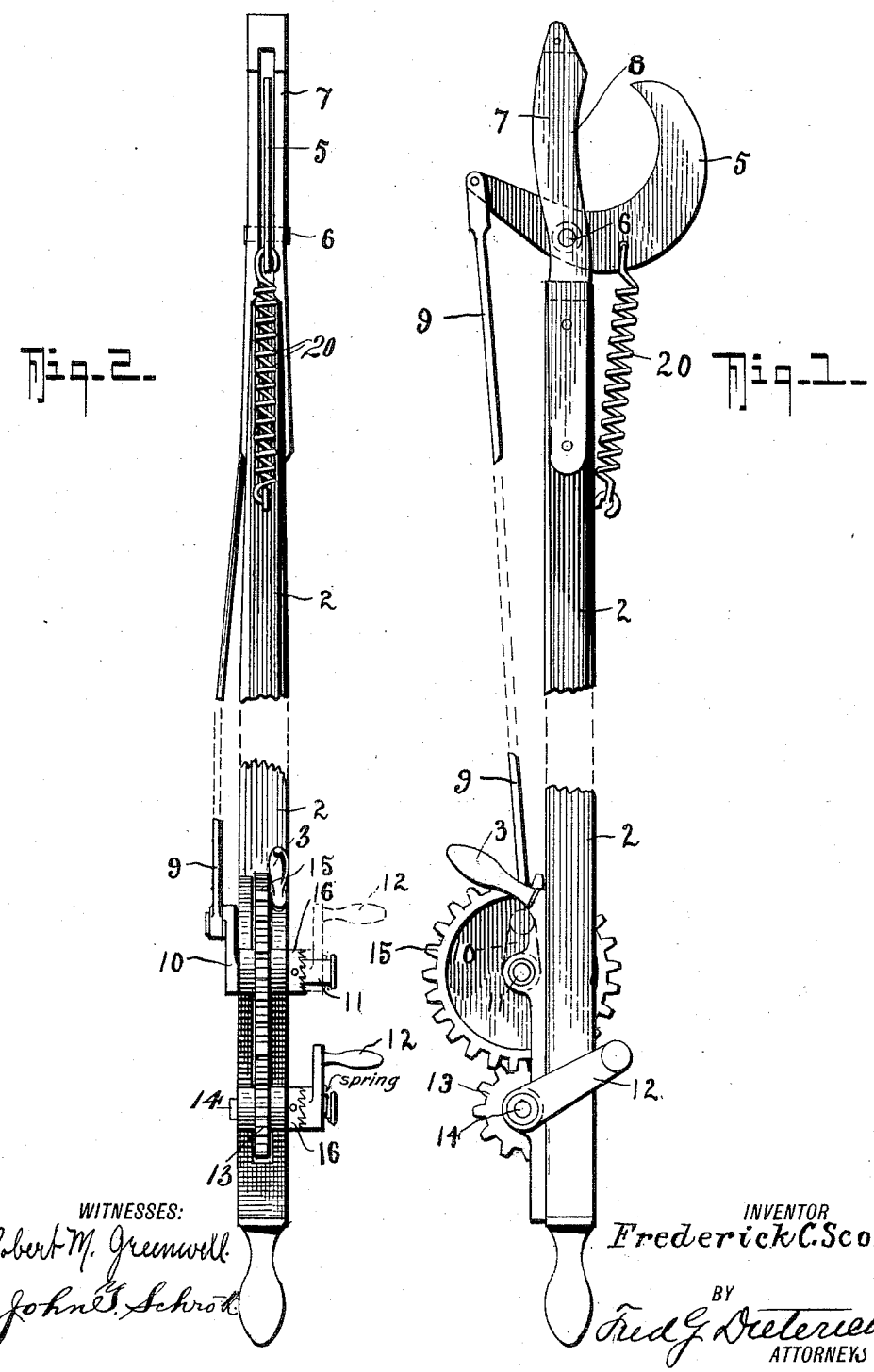

FREDERICK C. SCOTT, OF VANCOUVER, BRITISH COLUMBIA, CANADA, ASSIGNOR TO F. W. TROUNCE, OF VANCOUVER, CANADA.

BRUSH-CUTTING KNIFE.

1,018,784.  Specification of Letters Patent.  Patented Feb. 27, 1912.

Application filed August 21, 1911.  Serial No. 645,242.

*To all whom it may concern:*

Be it known that I, FREDERICK C. SCOTT, citizen of the Dominion of Canada, residing at Vancouver, in the Province of British Columbia, Canada, have invented a new and useful Brush-Cutting Knife, of which the following is a specification.

This invention relates to a mechanically operated brush cutting knife which has been particularly designed as a substitute for the slashing brush hook at present used in clearing operations in cutting away the undergrowth.

While the brush hook may be a satisfactory clearing implement when wielded by a man, who is an expert in its use, there is unavoidably a considerable amount of wasted energy due to the yielding character of the brush on which it is used, which yielding resistance absorbs the energy of the blow delivered that should be spent in cutting. An experienced man overcomes this difficulty by directing his blow slantingly so as to derive the endwise resistance of the branch or brush but as a cutting implement it is ineffective and unsatisfactory.

The invention, which is the subject of this application, is designed as a substitute for the ineffective brush hook, and consists of a mechanically operated lever knife acting against a rigid resistance between the split of which the knife is pivotally mounted.

The invention is particularly described in the following specification, reference being made to the drawings by which it is accompanied, in which:

Figure 1 is a side elevation, and Fig. 2, a view looking edgewise on the knife and the frame in which it is secured.

In these drawings 2 represents the handle on which the knife is carried and by which it is directed. This handle may be of any length suited to the work for which the implement is required. For brush cutting it need only be short, but where applied to pruning, will naturally be long enough to reach the higher branches of the trees and may also be made lighter. Toward the lower end it may be provided with a removable supplementary handle 3 to steady it while the other hand is used in driving the mechanism to operate the knife in the manner to be described.

The knife 5 is of hook form and is pivotally mounted on a pin 6 in the lengthwise split end of a resisting member 7, which is securely mounted on the end of the handle or pole 2, within which member 7 the knife 5 moves cutting against the slightly concave edges 8.

The shank of the knife 5 is produced beyond its fulcrum pin 6 and forms a lever for the attachment of the connecting rod 9 by which movement is applied to the knife from a crank 10 secured on a shaft 11, which is rotatably mounted in bearings secured to the handle 2 at the end held by the operator. On this crank shaft 11 for light cutting, a crank handle 12 may be mounted so that the crank may be driven direct, but for heavier brush cutting the shaft 11 is driven by means of a pinion 13 mounted on a shaft 14 and driving a wheel 15 secured to the shaft 11 in which case the crank handle 12 is mounted on the shaft 14. The driving contact of this handle with the respective shafts is preferably effected by a ratchet tooth face on the hub of the crank handle engaging a corresponding face on a collar 16 secured on each shaft 11 and 14, the handle being allowed endwise play on the shaft that it may move in or out of contact against the resistance of a light spring.

In operation after the crank 12 has been turned to effect the cut, the operator gives it a slight pull outwardly to disconnect the crank 12 from the clutch 16, where upon the spring 20 immediately returns the knife 5, to its starting point without changing the direction of the rotation of the crank 12. By this manner of connection the spring 20 by which the knife is drawn back and held normally in the open position will rotate the driving gear independent of the movement of the crank handle. The gearing may thus be proportioned to afford a powerful cutting stroke without the loss of time involved in making the backward stroke of the knife by means of the same slow gearing. A strong and serviceable brush cutting knife is thus furnished and one to which sufficient power may be applied to do the work effectively as the provision whereby the knife is free to return at once irrespective of the rotation of the driving crank handle, saves the objectionable loss of time which a slow moving cutting stroke would otherwise involve. As in cutting into brush the branches generally incline toward the operator, the fact that the opening between the knife and its cutting resistance is directed forward, enables the knife to be more effectively applied to the brush to be cut.

Having now particularly described my invention, I hereby declare that what I claim as new and desire to be protected in by Letters Patent, is:

1. A brush cutting knife comprising the combination with a carrying pole having a split or divided end within which split is pivotally mounted a hook shaped knife the shank of which is produced beyond its fulcrum, a driving shaft rotatably mounted on the pole, a crank handle rotatably and bodily movably mounted on the driving shaft and having driving contact therewith by means of ratchet teeth that will drive in one direction only, a second shaft adjacent to the aforementioned driving shaft and driven therefrom at a reduced rate of speed and second shaft having a crank, a connecting rod connecting the crank to the shank of the cutting knife and provision on the crank shaft by which it may be driven direct by the crank handle.

2. A brush cutting knife, comprising the combination with a carrying pole having a split or divided end within which split is pivotally mounted a hook shaped knife, a spring normally holding the knife in the open position, mechanical devices for operating the knife, said mechanical devices including an operating crank handle and a power transmitting mechanism releasably connected with said crank handle, said power transmitting mechanism when said crank handle is released being such that said spring will open said knife irrespective of the position of the crank handle when released.

3. A brush cutting implement comprising, a pole, a cutting knife pivotally mounted thereon, a spring continuously tending to hold said knife in a primary position, a crank shaft mounted in bearings on said pole, said crank shaft including a crank, a connecting rod between said crank and said knife, said crank shaft having an extension, a clutch member fixed on said extension to turn with said crank shaft, and a handle loosely mounted on said extension, and having a clutch face to coöperate with the clutch member on said shaft, said handle having movement along said shaft to engage and disengage said clutch member.

4. A brush cutting implement comprising, a pole, a cutting knife pivotally mounted thereon, a spring continuously tending to hold said knife in a primary position, a crank shaft mounted in bearings on said pole, said crank shaft including a crank, a connecting rod between said crank and said knife, said crank shaft having an extension, a clutch member fixed on said extension to turn with said crank shaft, and a handle loosely mounted on said extension, and having a clutch face to coöperate with the clutch member on said shaft, said handle having movement along said shaft to engage and disengage said clutch member, and means continuously tending to hold said handle in its "clutched" position.

In testimony whereof I have signed my name to this specification in the presence of two subscribing witnesses.

FREDERICK C. SCOTT.

Witnesses:
ROWLAND BRITTAIN,
WM. S. SOUTAR.

---

Copies of this patent may be obtained for five cents each, by addressing the "Commissioner of Patents, Washington, D. C."